C. Y. KNIGHT.
MACHINE FOR MAKING SCREWS, &c.
APPLICATION FILED JAN. 9, 1904.
914,353.
Patented Mar. 2, 1909.
6 SHEETS—SHEET 1.
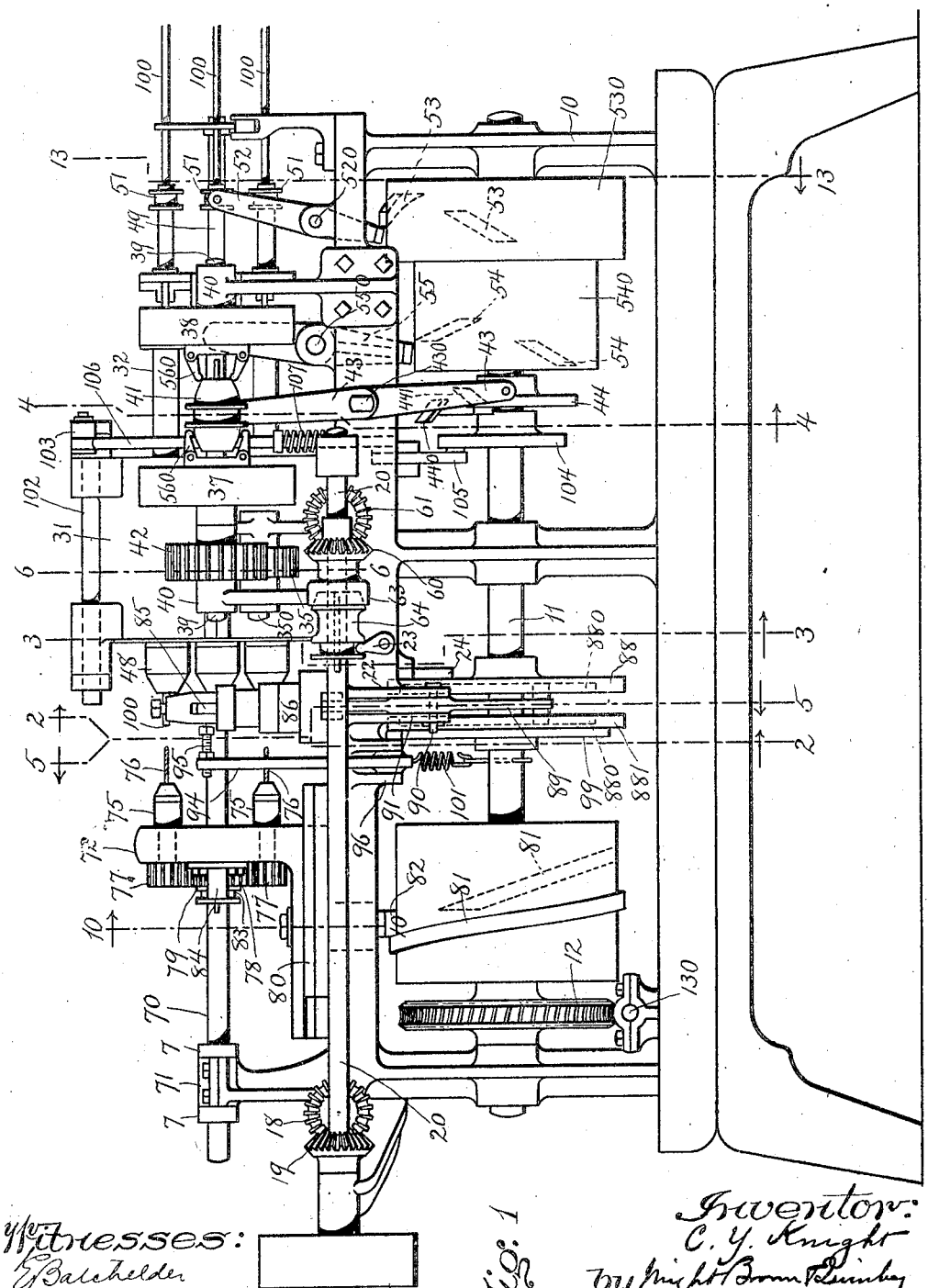

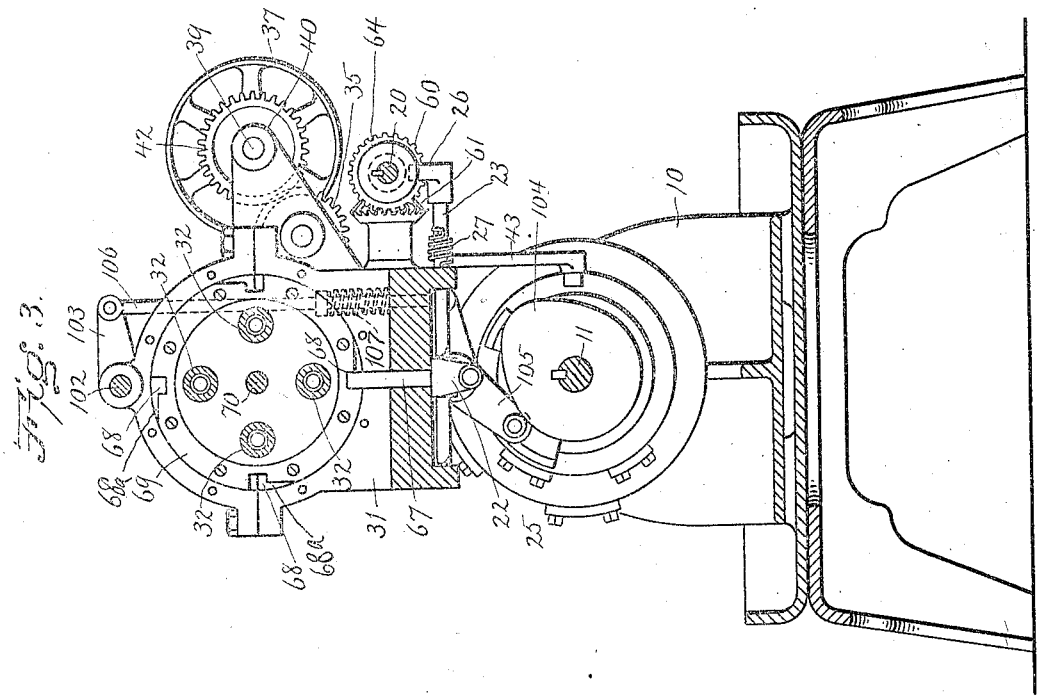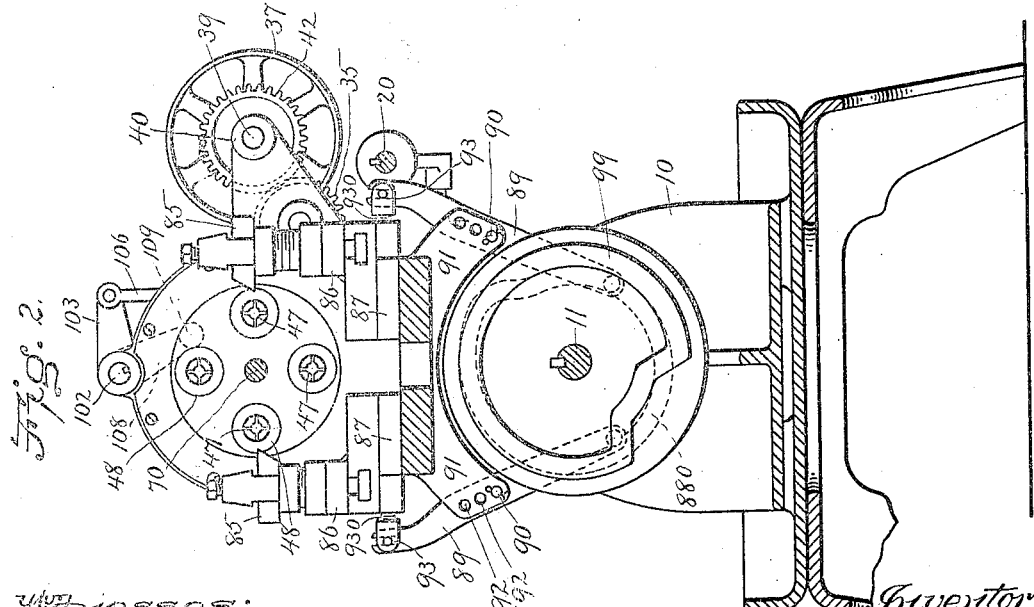

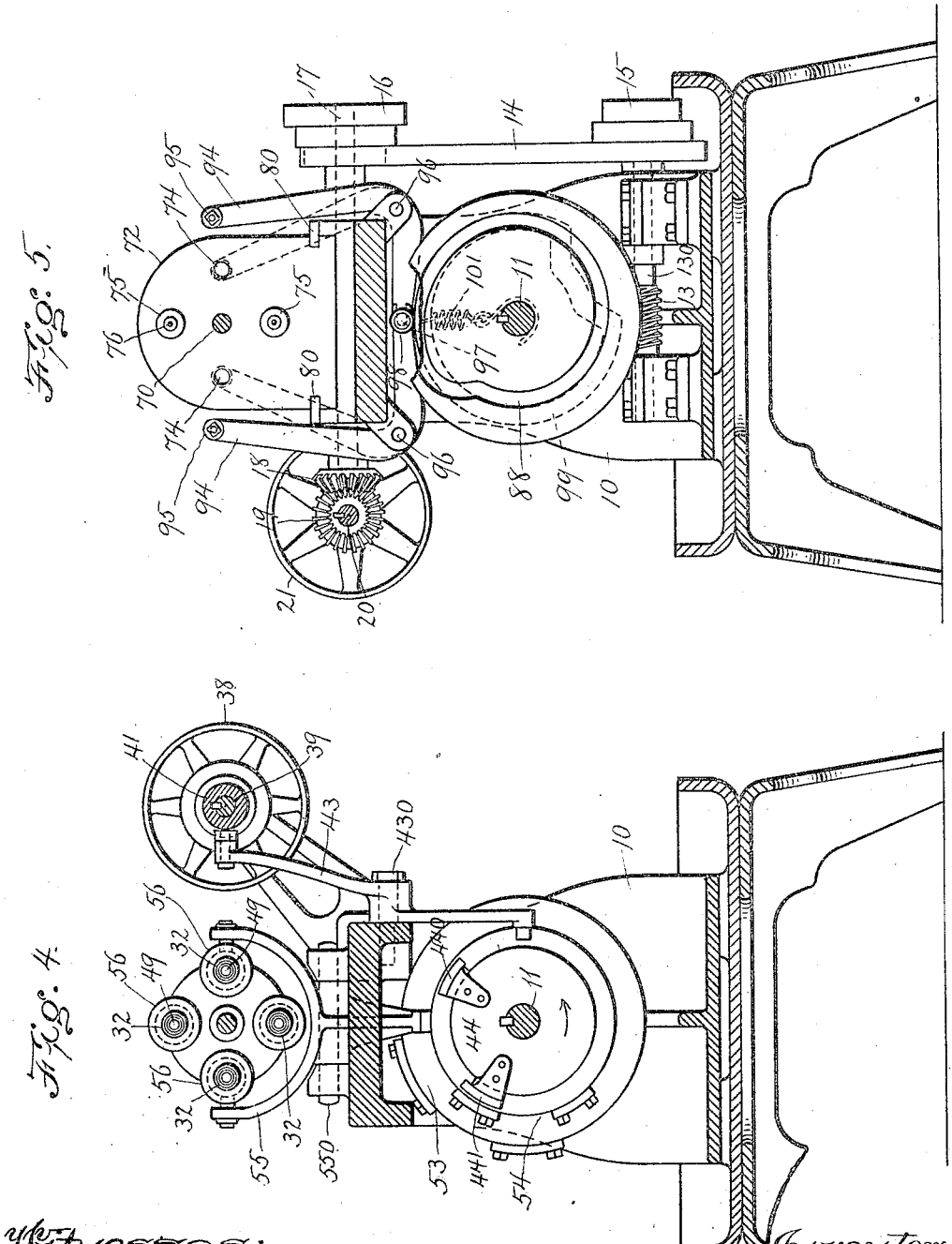

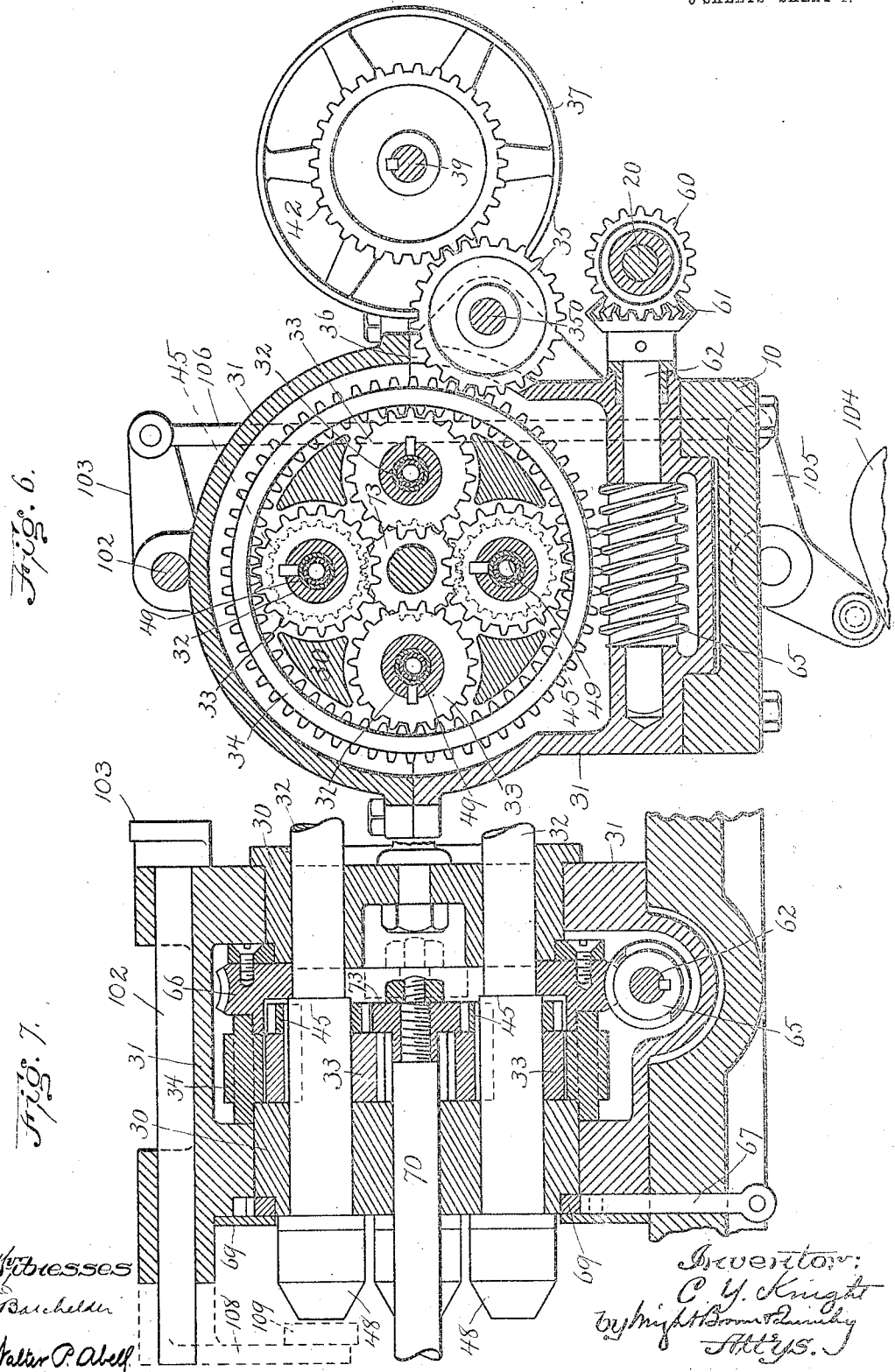

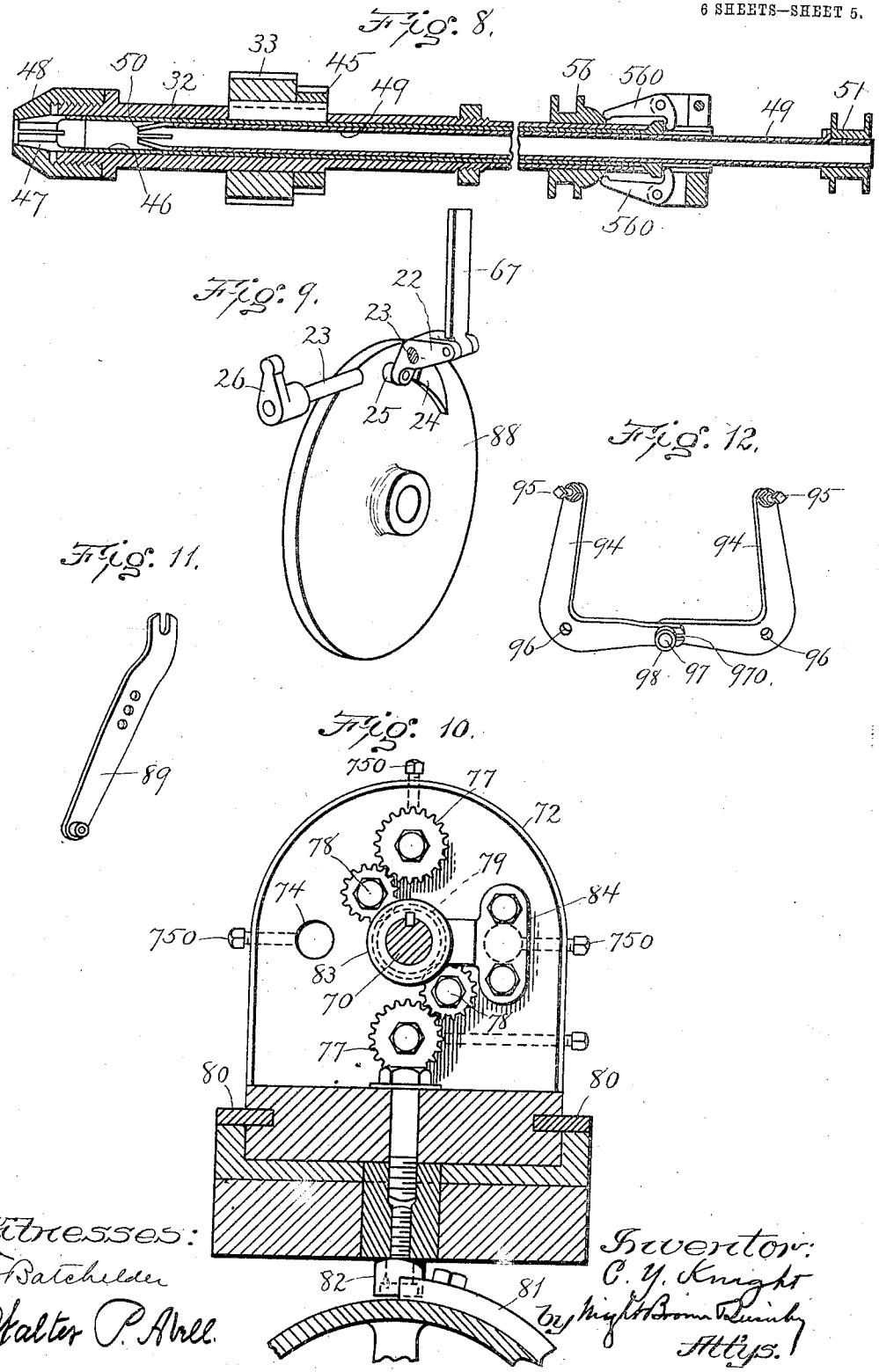

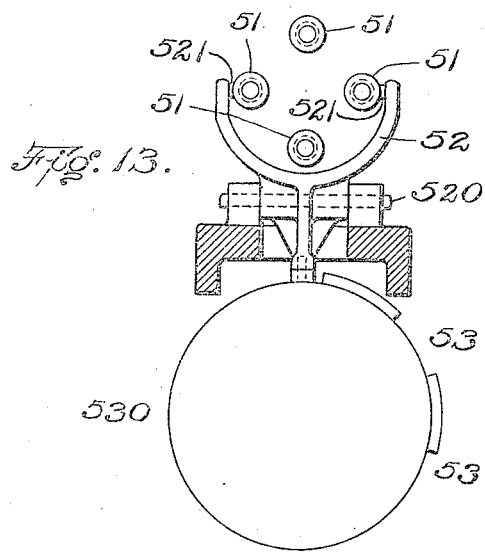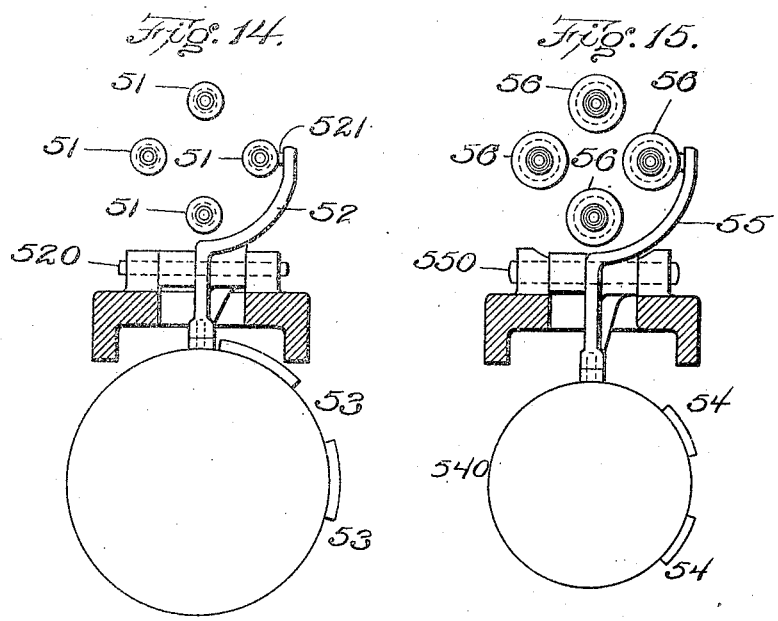

UNITED STATES PATENT OFFICE.

CHARLES Y. KNIGHT, OF BOSTON, MASSACHUSETTS, ASSIGNOR TO POWER & SPEED CONTROLLER COMPANY, OF WATERTOWN, MASSACHUSETTS, A CORPORATION OF NEW JERSEY.

MACHINE FOR MAKING SCREWS, &c.

No. 914,358.　　　Specification of Letters Patent.　　　Patented March 2, 1909.

Application filed January 9, 1904. Serial No. 188,294.

*To all whom it may concern:*

Be it known that I, CHARLES Y. KNIGHT, of Boston, in the county of Suffolk and State of Massachusetts, have invented certain new and useful Improvements in Machines for Making Screws, &c., of which the following is a specification.

This invention relates to automatic machines for forming small articles, such as screws, bushings, binding-posts, etc., by simultaneously rotating a series of rods or blanks held by a series of rotating spindles, and subjecting the forward ends of the rods or blanks to suitable forming tools and to a cutting-off tool or tools adapted to sever the completed article from the blank, the spindles being journaled in a turret which is rotated step-by-step and locked between its periods of rotation, to hold the blanks in position to coöperate with the cutters, the said spindles being rotated in one direction during the forming operation, and in the opposite direction during the separation of the forming tools from the work.

The invention has for its object to provide various improvements in a machine of this class, looking to the greater efficiency and speed of operation of the machine, and to the production of a wider range or class of products than in machines heretofore made.

The invention also consists in a certain organization of machine hereinafter described, whereby two blanks may be actuated simultaneously and acted on by forming tools of the same character to simultaneously produce a plurality of similar articles, the said organization being also such that the machine may be adapted to perform a plurality of successive operations on one and the same blank, so that only one article will be finished at a time.

The invention also consists in certain other improvements, all of which will be hereinafter described and claimed.

On the drawings, the machine is shown as organized for turning out two articles at one time, although as hereinafter described, its organization may be readily changed so that it will turn out but one article at a time.

Figure 1 is a side elevation of an improved screw-machine constructed in accordance with my invention. Fig. 2 is a vertical cross-section on the line 2—2 of Fig. 1. Fig. 3 is a vertical cross-section on the line 3—3 of Fig. 1. Fig. 4 is a vertical cross-section on the line 4—4 of Fig. 1. Fig. 5 is a vertical cross-section on the line 5—5 of Fig. 1. Fig. 6 is a vertical cross-section on the line 6—6 of Fig. 1. Fig. 7 is a vertical longitudinal section of the turret shown in Fig. 6. Fig. 8 is a vertical longitudinal section of one of the spindles, complete. Fig. 9 is a perspective view of the mechanism for unlocking the spindle-turret. Fig. 10 is a vertical cross-section on line 10—10 of Fig. 1, showing the tool-driving mechanism. Fig. 11 is a perspective view of one of the levers which actuate the cutter-carriages. Fig. 12 is a perspective view of the stop-arms which determine the length to which the blank material is to be fed. Fig. 13 represents a section on line 13—13 of Fig. 1. Fig. 14 is a modification of Fig. 13. Fig. 15 represents another modification.

The same reference characters indicate the same parts in all the figures.

In the drawings,—10 represents the frame of the machine, and 11 the usual cam-shaft. The shaft 11 may be driven by any suitable mechanism, which in this embodiment of my invention comprises a worm-gear 12 keyed to said shaft, a worm 13 (Fig. 5) the shaft 130 of which is driven by a belt 14 passing over pulleys 15 and 16, and a cross-shaft 17 (Fig. 5) in turn driven by a bevel-gear 18 meshing with a bevel-gear 19 on the primary driving-shaft 20, which receives its power from a belt passing over the pulley 21.

The spindle-turret 30 (Figs. 6 and 7) is inclosed in a sectional casing 31 secured to the frame 10. The spindles 32, of which four are here shown, are journaled in the turret 30, and are provided with spur-pinions 33 33 (Figs. 6 and 7), which are simultaneously rotated by internal gear-teeth formed on a ring 34 (Fig 6) surrounding the turret 30. The said ring has external gear-teeth meshing with a driving-gear, as hereinafter described. One edge of the ring 34 bears on a portion of the periphery of the turret 30, and the other edge flange on a worm-gear 66 hereinafter described. The ring or double gear 34 is alternately driven forwardly and backwardly, to impart like movements to the spindles, by an intermediate pinion 35 (Fig. 6) which meshes with the external gear-teeth and is affixed to a shaft 350 which is journaled in bearings outside the casing 31, the pinion 35 projecting through an opening 36 (Fig. 6) in said casing. The pinion 35 receives its power from suitable reversible driving mechanism, which is located in close proximity to the turret 30, and comprises two clutch-pulleys 37 and 38 driven by belts in opposite directions upon a shaft 39 mounted in bearings 40, a clutch-cone 41 feathered to the shaft between the pulleys 37 and 38 and adapted to slide thereon while retaining its rotative engagement therewith, a gear 42 keyed rigidly to said shaft and meshing with the gear 35, a shipping-lever 43 pivoted at 430 to the frame of the machine, and cams 440 441 (Figs. 1 and 4) on a disk 44 affixed to the shaft 11, said cams being formed to throw the shipping lever first in one direction and then in the opposite direction, to cause the cone 41 to alternately engage the pulleys 37 and 38 at predetermined periods. Two of the spindles 32 32 are provided with additional pinions 45 45 (Figs. 6 and 7), which constitute parts of the mechanism for rotating the cutting tools, as hereinafter described.

Each spindle is provided with mechanism for alternately gripping and releasing a wire rod or blank 100, said mechanism comprising a longitudinally movable sleeve 46 (Fig. 8) within the spindle, compressible chuck-jaws 47 at one end of said sleeve, an internally tapered collar 48 affixed to the spindle and surrounding the chuck-jaws, and means for imparting a longitudinal thrust to the sleeve 46 in the direction required to force the chuck-jaws forwardly and thus cause their compression by the collar 48 upon the rod or blank 100. Each spindle is also provided with a device for feeding the rod or blank lengthwise through the spindle and chuck-jaws when the latter are released and open, said means comprising a longitudinally movable tube 49 (Fig. 8) which projects within the spindle and the sleeve 46, and which has spring-jaws 50 which yieldingly close upon the rod and are adapted to feed the rod when the tube 49 is thrust forward, and to slip upon the rod when the tube is moved back, a flanged collar 51 affixed to the outer end of the tube 49, and an oscillating lever 52 fulcrumed at 520 to the frame 10. Said lever has two arms, as shown in Fig. 13, having studs 521 which simultaneously engage grooved collars 51 51 on the tubes 49 of two of the spindles, said spindles being at opposite sides of the axis of the turret. The turret is rotated step-by-step as hereinafter described, and each partial rotation brings two of the collars 51 into engagement with the arms of the lever 52. The said lever is oscillated by cams 53 53 on a cylinder 50 affixed to the shaft 11, and longitudinally reciprocates the tubes 49 of the two spindles engaged by the lever 52. Cams 54 54 on a cylinder 540 affixed to the shaft 11 actuate the mechanism which alternately opens and closes the chuck-jaws 47. Said mechanism comprises a lever 55 (Fig. 4) fulcrumed at 550 to the frame 10 and having two arms which simultaneously engage two flanged cones 56. Said cones, of which one is provided for each spindle, are fitted to slide on the spindles, each cone cooperating with levers 560 (Fig. 8) pivoted to a support upon the corresponding spindle, the longer arms of said levers bearing on the cone 56 and the shorter arms on the rear end of the rod- or blank-grasping thrust-sleeve 46 in the spindle, the arrangement being such that when the cone is moved forward, the chuck-jaws are released, so that the rod 100 may be freely fed between them, and when the cone is moved backward, it causes the levers 560 to force the sleeve 46 forward and grasp the rod or blank.

The means for rotating the turret 30 step-by-step are as follows: Upon the primary power-shaft 20, which extends along one side of the base of the casing 31 is loosely mounted a bevel-gear 60, which meshes with a bevel-gear 61 (Fig 6) affixed to a cross-shaft 62 (Figs. 6 and 7), said shaft being mounted in bearings in the base of the casing 31. The hub of the gear 60 is provided with an internal tapered friction clutch member 63 (shown by dotted lines in Fig. 1), which is formed to frictionally engage the correspondingly tapered periphery of a clutch-collar 64 having a sliding and rotative engagement with the shaft 20. Affixed to the cross-shaft 62 is a worm 65 (Figs. 6 and 7), which meshes with the above-mentioned worm-gear 66 affixed to the turret 30. The turret is alternately locked and released by a latch 67 (Fig. 3), which coacts with notches 68 68 in a ring 69 secured to one end of the turret. The lower end of the latch 67 is attached to one arm of a lever 22 (Figs. 3 and 9) affixed to a rock-shaft 23 which is mounted in fixed bearings on the frame of the machine. The lever 22 and shaft 23 are caused to rock by the alternate action of a spring 27 (Fig. 3) and a cam 24 (Fig. 9). Said cam engages a roller 25 on the arm of the lever 22 opposite the arm engaged with the latch 67. The cam 24 is affixed to a disk 88 keyed to the shaft 11. To the shaft 23 is secured an arm or lever 26 (Figs. 1 and 9), which engages a groove in the clutch collar 64. When the cam 24 actuates the lever 22, said lever withdraws the latch 67 from the notch 68 which it then occupies, and at the same time the rock-shaft 23 causes the lever 26 to force the clutch-collar 64 into frictional engagement with the clutch member 63 affixed to the gear 60. Said gear is thereby caused to rotate with the shaft 20, and to rotate the turret through the connections described. The latch 67 is held down by the periphery of the ring 69, which rotates with the turret. As soon as the succeeding notch 68 registers with the latch 67, said latch is forced into said notch by the spring 27, which is affixed at one end to the shaft 23 and at the other end to the frame of the machine. At the same time, the arm 26 withdraws the clutch-collar 64 from frictional engagement with the member 63 on the gear 60, so that the operation of the turret-rotating mechanism ceases when the turret is locked. The path or way formed by the ring 69 for holding the latch 67 against the compression of its spring 27, is cut away or depressed at the parts adjacent to the notches or sockets 68 on the sides of the notches approached by the latch, as shown in Fig. 3 at 68ᵃ. This permits the spring pressed latch to be urged inward as a notch approaches, so that it must of a certainty abut against the farther wall of the notch. All possibility of the notches being thrown past the latch is thus avoided, and the entrance of the latch into the notches and the consequent arrest of the turret is insured.

The mechanism thus far described provides for the feeding, the clutching, and the rotation of the rods or blanks 100, and for the rotating and locking of the turret 30.

The mechanism for rotating the cutting or forming tools will be next described. A shaft 70, whose outer end is journaled in a fixed bearing 71, extends through a bearing in the center of a sliding head 72, and into a bearing in the turret 30. Said shaft is provided with a spur-pinion 73 (Figs. 6 and 7), which is affixed to the inner end of the shaft and is driven by the above-mentioned pinions 45 45 on two of the spindles 32. The head 72 is provided with sockets or bearings 74 (Fig. 5) for the reception of tool-chucks 75 holding and operating the forming or cutting tools, there being as many bearings 74 as there are spindles. In the embodiment of my invention here shown, only two chucks are employed, each chuck holding a tool 76, which is or may be a drill. It will be understood, however, that each socket may be provided with a working tool, and that the tools may be members of a series, each performing its allotted work on the blanks. The arbor of each chuck passes through its socket 74, and is provided with a pinion 77 (Figs. 1 and 10). Intermediate pinions 78 78 connect the pinions 77 77 with a gear 79 feathered on the shaft 70 and adapted to slide thereon. It will be seen, therefore, that the forming tools 76 receive from the spindles 32 a rotary motion opposite to that of the spindles. The head 72, which slides between fixed guides 80 (Fig. 10) is fed up to and withdrawn from the work 100 by means of cams 81 81 which are affixed to a cylindrical body 811 on the shaft 11 and act on a roller 82 connected with the head. As the head 72 slides along the shaft 70, it carries with it the slidable gear 79, the hub of the said gear being provided with a groove 83, into which projects an arm on bracket 84 (Fig. 10) secured to the head 72.

Two cutting tools 85 85 (Fig. 2) are provided, to sever the finished articles from the rods on which they are formed. Said cutting tools are mounted on carriages 86 86 (Fig. 2) located on opposite sides of the machine, between the turret 30 and head 72, said carriages being adapted to slide transversely of the machine-bed, in guides 87 87. Cam-grooves 880 880 (Fig. 2) formed in disks 88 881 on the shaft 11, one for each cutter-carriage 86, feed said carriages toward and from the blanks 100, in coöperation with levers 89 89 which are fulcrumed at 90 to brackets 91 on the machine-frame, each lever having a trundle-roll at its lower end engaged with a cam-groove 880, a slot at its upper end receiving a pin on a forked piece 93, which has a screw-threaded shank 930 (Fig. 2) adjustably engaged with a tapped socket in a cutter-carriage 87. This adjustable connection provides for the adjustment of the carriages 87. The throw of the upper end of the lever 89 may be varied by shifting the fulcrum 90 to either of a series of orifices 92 formed in fixed brackets 91 (Fig. 2). Each lever 89 has a corresponding number of orifices, as shown in Fig. 11, so that the shifting of the fulcrum 90 will not dislocate said levers. A very wide and accurate range of adjustment is thus provided for the cutting tools 85. The two cutters 85 are timed to approach and recede from the work simultaneously.

It will be seen from the foregoing description, that the blanks 100 are fed forward step-by-step, and locked after each advancement; and it will also be seen that the blanks in two diametrically opposite spindles are fed forward when said spindles are in a horizontal plane relatively to each other; or in other words, are in position to be engaged by the two arms of the lever 52, as shown in Fig. 13.

Provision is made for determining the length of the forward feed of the blanks, as follows: Two bell-crank levers 94 (Figs. 1, 5, and 12) having in their upper ends adjustable stop-bolts 95, are provided, one for each of the two simultaneously-fed blanks. Said levers are fulcrumed to the frame 10 at 96 96. The lower ends of said levers extend horizontally toward each other, below the bed of the frame 10. The inner ends of said levers overlap each other, and are connected by a stud 97, which is affixed to one lever, and which plays in a slot 970 (Fig. 12) in the other lever. On the outer end of said stud 97 is a roller 98, which is held against a cam 99 by a spring 101. The cam 99 is timed to force the stop-bolts 95 into the path of blanks which are being advanced while the head 72 is at the backward extreme of its movement, as shown in Fig. 1. The blanks 100 therefore abut against the stop-bolts 95 when they are advanced, and the length of the feed movement of said blanks is determined by the adjustment of said bolts. When the blanks have been fed forward to the stop-bolts 95, the levers 94 are swung outwardly to allow the head 72 to advance between them.

The machine organized as above described is adapted to turn out a product of a relatively simple nature, requiring but one operation, such as the formation of a longitudinal orifice by a drill 76, to prepare the article before it is severed from the blank on which it is formed. It is evident, then, that as two blanks are fed at one time, two blanks acted on at one time, and two formed articles severed at one time, the capacity of this machine, in which one complete article is produced from each blank for every one hundred and eighty degrees of rotation of the turret 30, is twice as great as that of the ordinary type of machine of this class, in which one complete article is produced from each blank for each complete revolution of the turret.

The machine may be adapted to produce work of a more complicated nature, requiring two or more successive operations on each blank, by providing each socket 74 in the head 72 with a cutting tool, each tool being geared to the central gear 79, and each being formed to perform its allotted part of the forming operation. When the article is to be formed by successive operations, as last indicated, the levers 52 and 55 should be formed to engage but one of the collars 51 and 56, as shown in Figs. 14 and 15, so that only one blank or rod will be fed forward at a time, the result being the formation of but one article during each complete rotation of the turret, instead of two articles. When the machine is operated as last described, but one severing tool will be required, and the place of the other severing tool may be occupied by another forming tool, which may be located in the adjacent socket 74. Each blank may therefore be subjected to as many as three operations from as many tools in the head 72, before the severing operation. Another operation may be performed by substituting for one of the severing cutters 85, a tool adapted to form a peripheral groove in the otherwise formed article.

In addition to the operations above described, provision is made for subjecting the article to an additional tool, such as a nurl, adapted to roll or rotate in contact with the said article. To this end, I provide a rock-shaft 102, journaled in bearings on the upper portion of the turret-casing 31. To the rear end of said rock-shaft is affixed an arm 103 (Figs. 2 and 3). Said rock-shaft is oscillated by a cam 104 on the shaft 11 and a spring 107 (Figs. 1 and 3) hereinafter described. The cam 104 acts directly upon a lever 105 fulcrumed on the frame 10. Said lever imparts motion to the arm 103 through a rod 106, and is held against the cam 104 by the spring 107 (Figs. 1 and 3), which bears at its lower end on a fixed support and exerts an upward pressure on a collar affixed to the rod 106. To the forward end of the rock-shaft 102 is attached an arm 108, shown in dotted lines in Figs. 2 and 7. A rotary nurling tool 109 is mounted on the end of said arm, and is swung by the rocking of the shaft 102 against one of the blanks 100 in close proximity to the chuck 48 holding said blank.

The rotary tools or drills 76 carried by the head 72 may be locked against rotation by loosening the collars 77 on the shaft 70, and sliding said shaft toward the turret 30 until the pinion 73 (Fig. 7) is thrown out of engagement with the pinions 45, as shown by dotted lines in Fig. 7, and then screwing up the set-bolts 750 against the arbors of the tool-chucks 75 in the sockets 74.

I claim:

1. A machine of the character stated, comprising a turret rotated step-by-step, rotary spindles journaled therein, means for simultaneously feeding blanks in two of said spindles at opposite sides of the axis of the turret, a pair of bell-crank levers connected together so that movement of one operates the other pivoted to the frame of the machine and adapted to oscillate in a plane at right angles to the feed movement, said levers having adjustable stop-screws, and means for oscillating said levers simultaneously in opposite directions to move the stop-screws alternately into and out of the paths of said simultaneously fed blanks.

2. A machine of the character stated, comprising a rotary turret having a series of work-holding spindles, a worm gear affixed to the turret, a worm-shaft, the worm of which is engaged by said worm-gear, a driving shaft having a loose gear meshing with a gear affixed to the worm-shaft, said loose gear having a clutch member, a movable clutch member having a sliding and rotative engagement with the driving-shaft, a turret locking device, a rock-shaft connected with the locking device and with the movable clutch member, and automatic means for rocking said shaft simultaneously to actuate the locking device and the movable clutch member alternately to rotate and arrest the turret.

In testimony whereof I have affixed my signature, in presence of two witnesses.

CHARLES Y. KNIGHT.

Witnesses:
C. F. BROWN,
E. BATCHELDER.